United States Patent
Zha

(10) Patent No.: US 11,024,239 B2
(45) Date of Patent: Jun. 1, 2021

(54) LIQUID CRYSTAL DISPLAY

(71) Applicant: Wuhan China Star Optoelectronics Technology Co., Ltd., Hubei (CN)

(72) Inventor: Guowei Zha, Hubei (CN)

(73) Assignee: WUHAN CHINA STAR OPTOELECTRONICS TECHNOLOGY CO., LTD., Hubei (CN)

( * ) Notice: Subject to any disclaimer, the term of this patent is extended or adjusted under 35 U.S.C. 154(b) by 490 days.

(21) Appl. No.: 16/069,287

(22) PCT Filed: Apr. 20, 2018

(86) PCT No.: PCT/CN2018/083906
§ 371 (c)(1),
(2) Date: Jul. 11, 2018

(87) PCT Pub. No.: WO2019/148665
PCT Pub. Date: Aug. 8, 2019

(65) Prior Publication Data
US 2021/0082356 A1 Mar. 18, 2021

(30) Foreign Application Priority Data
Jan. 30, 2018 (CN) .......................... 201810090389.1

(51) Int. Cl.
*G06K 9/00* (2006.01)
*G09G 3/34* (2006.01)
(Continued)

(52) U.S. Cl.
CPC ....... *G09G 3/3426* (2013.01); *G02F 1/13338* (2013.01); *G02F 1/133603* (2013.01);
(Continued)

(58) Field of Classification Search
CPC .............. G09G 3/3426; G09G 3/3611; G09G 2320/0233; G09G 2360/14; G02F 1/1338;
(Continued)

(56) References Cited

U.S. PATENT DOCUMENTS

2012/0288139 A1 11/2012 Singhar
2017/0147865 A1* 5/2017 Jensen ............... G06K 9/00087
2017/0242533 A1* 8/2017 Liu .................... G06K 9/00013

FOREIGN PATENT DOCUMENTS

CN 101846859 A 9/2010
CN 105702176 A 6/2016
(Continued)

*Primary Examiner* — Abdul-Samad A Adediran
(74) *Attorney, Agent, or Firm* — Leong C. Lei

(57) ABSTRACT

The present disclosure relates to a liquid crystal display including a liquid crystal panel. The liquid crystal panel includes a plurality of photodetectors, a plurality of first sub-pixels and a plurality of second sub-pixels respectively corresponding to the photodetectors. Each of the photodetectors partially overlaps with an opening area of the corresponding first sub-pixel. The liquid crystal display further includes a backlight module facing toward the liquid crystal panel having a first light emission section and a second light emission section. The first light emission section faces toward the first sub-pixels, and the second light emission section faces toward the second sub-pixels. A light emission brightness of the first light emission section is greater than the light emission brightness of the second light emission section.

17 Claims, 3 Drawing Sheets

(51) Int. Cl.
    *G02F 1/1333*      (2006.01)
    *G02F 1/13357*      (2006.01)
    *G09G 3/36*      (2006.01)
    *G02F 1/1335*      (2006.01)

(52) U.S. Cl.
    CPC ....... *G06K 9/0004* (2013.01); *G06K 9/00013* (2013.01); *G06K 9/00087* (2013.01); *G09G 3/3611* (2013.01); *G02F 1/133612* (2021.01); *G09G 2320/0233* (2013.01); *G09G 2360/14* (2013.01)

(58) Field of Classification Search
    CPC ........ G02F 1/133603; G02F 1/133612; G06K 9/0004; G06K 9/00087; G06K 9/00013
    See application file for complete search history.

(56) References Cited

FOREIGN PATENT DOCUMENTS

| | | |
|---|---|---|
| CN | 106970495 A | 7/2017 |
| KR | 101718476 B1 | 3/2017 |

\* cited by examiner

LIQUID CRYSTAL DISPLAY

RELATED APPLICATIONS

The present application is a National Phase of International Application Number PCT/CN2018/083906, filed Apr. 20, 2018, and claims the priority of China Application No. 201810090389.1, filed Jan. 30, 2018.

BACKGROUND

1. Technical Field

The present disclosure relates to liquid crystal display field, and more particularly to a liquid crystal display.

2. Description of Related Art

In modern society, the interaction between humans and displays has become an important way for people to obtain and share information. Among them, liquid crystal displays have become the mainstream of current displays because of their good image reproducibility. This is because of the resolution, frame rate, color gamut, and color of liquid crystal displays. Attributes, such as partiality, contrast, viewing angle, crosstalk, flicker, etc. have gradually satisfied the human eye's visual requirements for display quality.

The latest breakthrough direction of mobile terminal display technology in recent years is to pay more attention to the integration of new interactive technologies and enhance the visual aesthetics. One of the important directions is the full-screen display technology with a higher proportion of screens. The key breakthrough is the display panel. Compression of the upper and lower left and right borders, profile cutting of cameras and detectors, and in-plane fingerprint identification. At present, the more commonly used method is the use of frontal fingerprint recognition technology. The traditional fingerprint identification technology adopts an integrated solution with the Home key, but the requirements of the full screen technology make in-plane fingerprint identification the current priority. At present, there are mainly three major fingerprint identification technology solutions: capacitive fingerprinting, ultrasonic fingerprinting, and optical fingerprinting. Optical fingerprinting, because of its ability to penetrate thicker cover glass, is currently the closest to mass production.

Optical fingerprint recognition has become a major focus of research breakthroughs in liquid crystal display technology. One of the important difficulties lies in the fact that the in-plane identification area of the liquid crystal display needs a photodetector, which will inevitably affect the in-plane detection. The penetration rate and gray level brightness of the area are recognized, resulting in uneven display of the entire surface of the liquid crystal display.

SUMMARY

Thus, it is important to provide a liquid crystal display, incorporated with at least one photodetector, having uniform display performance.

In one aspect, a liquid crystal display includes: a liquid crystal panel includes a plurality of photodetectors, a plurality of first sub-pixels and a plurality of second sub-pixels respectively corresponding to the photodetectors, each of the photodetectors partially overlapping with an opening area of the corresponding first sub-pixel; and a backlight module facing toward the liquid crystal panel having a first light emission section and a second light emission section, the first light emission section facing toward the first sub-pixels, the second light emission section facing toward the second sub-pixels, and a light emission brightness of the first light emission section being greater than the light emission brightness of the second light emission section.

Wherein a ratio of the light emission brightness of the first light emission section to the light emission brightness of the second light emission section equals to the ratio of the light emission brightness of the second light emission section to the light emission brightness of the first light emission section.

Wherein the first light emission section comprises a plurality of first LEDs, and the second light emission section comprises a plurality of second LEDs, and a driving current of the first LEDs is greater than the driving current of the second LEDs.

Wherein the backlight module further comprises: a LED driver configured to respectively provide a driving current to the first LED and the second LED; and an amplifier circuit configured between the LED driver and the first LEDs to amplify the driving current provided from the LED driver to the first LEDs.

Wherein the first LEDs and the second LEDs connect to the LED driver via at least one bonding electrode within a bonding area.

Wherein an arrangement of the first LEDs of the first light emission section is the same with the arrangement of the second LEDs of the second light emission section.

Wherein each of the first LEDs corresponds to one first sub-pixel, and each of the second LEDs corresponds to one second sub-pixel.

Wherein the first LEDs and the second LEDs are Micro LEDs.

Wherein the photodetectors are arranged in a matrix.

Wherein the photodetectors comprise fingerprint identification photodetectors.

In view of the above, the loss of the transmittance of the first sub-pixel is compensated by increasing the light emission brightness of the first light emission section, which is opposite to the first sub-pixels. Thus, the display brightness of the LCD panel is uniform.

BRIEF DESCRIPTION OF THE DRAWINGS

In order to more clearly illustrate the embodiments of the present disclosure or prior art solutions, the drawings used in the description of the embodiments or prior art will be briefly described below. The drawings are merely some embodiments of the present disclosure, and those skilled in the art can also obtain other drawings based on these drawings without any creative work.

DETAILED DESCRIPTION

Figure 1:
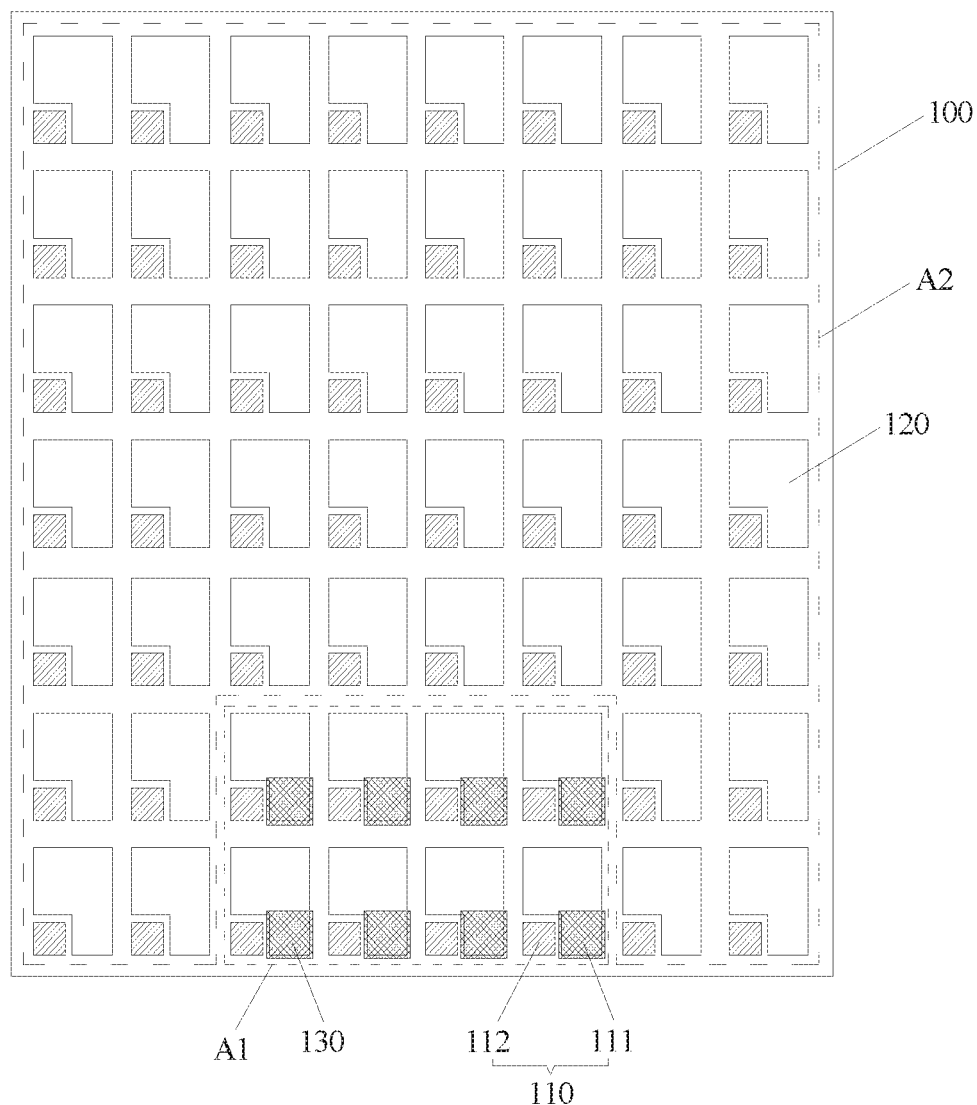
FIG. 1 is a schematic view showing the liquid crystal panel in accordance with one embodiment of the present disclosure.

Following embodiments of the invention will now be described in detail hereinafter with reference to the accompanying drawings.

In the drawings, the thicknesses of layers and regions may be exaggerated for clarity. Same reference numerals refer to the same components throughout the specification and the drawings.

It can be understood that, although the terms first, second, etc. may be used herein to describe various elements, these elements should not be limited by these terms. These terms are only used to distinguish one element from another element.

FIG. 1 is a schematic view showing the liquid crystal panel in accordance with one embodiment of the present disclosure.

In one embodiment, a liquid crystal panel 100 includes a plurality of first sub-pixels 110, a plurality of second sub-pixels 120, and a plurality of photodetectors 130.

The first sub-pixels 110 and the second sub-pixels 120 are arranged in a matrix. The area where the plurality of first sub-pixels 110 is located is defined as the in-plane identification area A1, and the area where the plurality of second sub-pixels 120 is located is defined as the non-recognition area A2 located outside the in-plane identification area A1.

The plurality of first sub-pixels 110 correspond to the plurality of photodetectors 130. That is, the photodetectors 130 are located in the in-plane identification area A1. Specifically, the first sub-pixel 110 generally includes an opening area 111 and a component area 112, wherein the opening area 111 can generally allow the backlight provided by the backlight module to pass through. The device area 112 usually configured with component, such as thin film transistor (TFT), and thus the device area 112 cannot allow the backlight provided by the backlight module to pass through. It should be noted that the second sub-pixel 120 has the same pixel structure as the first sub-pixel 110.

Further, in the present embodiment, each of the photodetectors 130 corresponds to one first sub-pixel 110, and one photodetector 130 partially overlaps with the opening area 111 of the corresponding first sub-pixel 110. In this way, this photodetector 130 affects the transmittance of the opening area 111 of the first sub-pixel 110 having an overlapping portion thereof, so that the transmittance of the opening area 111 of the first sub-pixel 110 is decreased.

In this way, the opening area 111 of each of the first sub-pixels 110 partially overlaps with the corresponding photodetector 130, such that a display brightness of the in-plane identification area A1 is lower than the display brightness of the non-recognition area A2, which results in a non-uniform display performance of the liquid crystal panel 100.

Figure 2:
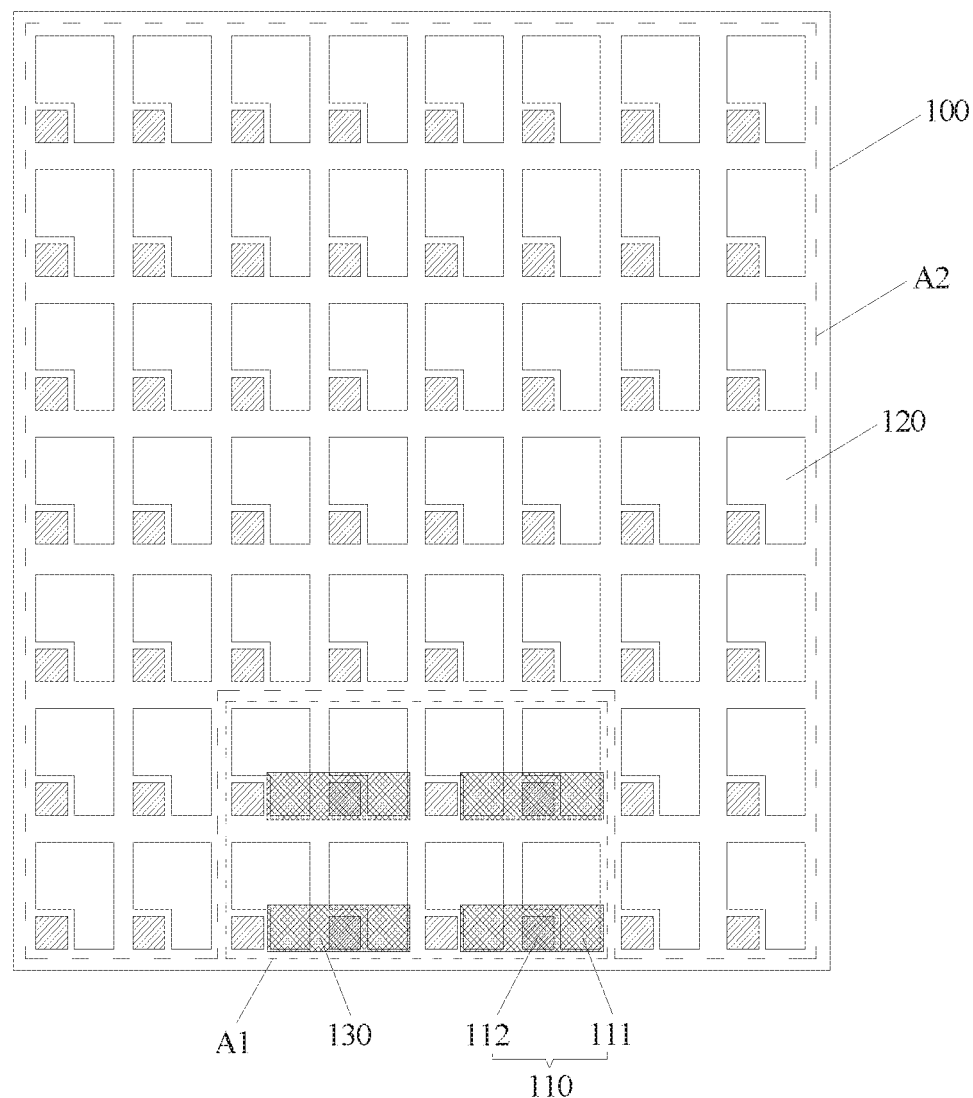
FIG. 2 is a schematic view showing the locations of the optical detector and the first sub-pixel in accordance with another embodiment of the present disclosure.

In another embodiment, referring to FIG. 2, each of the photodetectors 130 may correspond two first sub-pixels 110. In this way, each of the photodetectors 130 partially overlaps with the opening areas 111 of the two first sub-pixels 110. It can be understood that each of the photodetectors 130 may be configured to be corresponding to three or more than three first sub-pixels 110 in accordance with real scenarios.

Generally, the liquid crystal panel 100 includes an array substrate (not shown) and a color filter (CF) substrate (not shown). In one embodiment, the photodetectors 130 may be configured on the array substrate or the CF substrate. The only requirement is that the photodetector 130 partially overlaps with the opening area 111 of the corresponding first sub-pixel 110. That is, a projection of the photodetectors 130 on the corresponding first sub-pixel 110 is within the opening area 111 of the corresponding first sub-pixel 110.

As is well known, the liquid crystal panel 100 does not emit light, so its display must be displayed using the backlight provided by the backlight module to which it is opposed. In order to solve the display unevenness of the liquid crystal panel 100, this embodiment also provides a backlight module.

In one embodiment, a plurality of photodetectors 130 are, but not limited to, configured within the in-plane identification area A1 in a matrix. In addition, the photodetectors 130 may include, but not limited to, fingerprint identification photodetectors. In this way, the in-plane identification area A1 is configured to be a fingerprint identification area.

Figure 3:
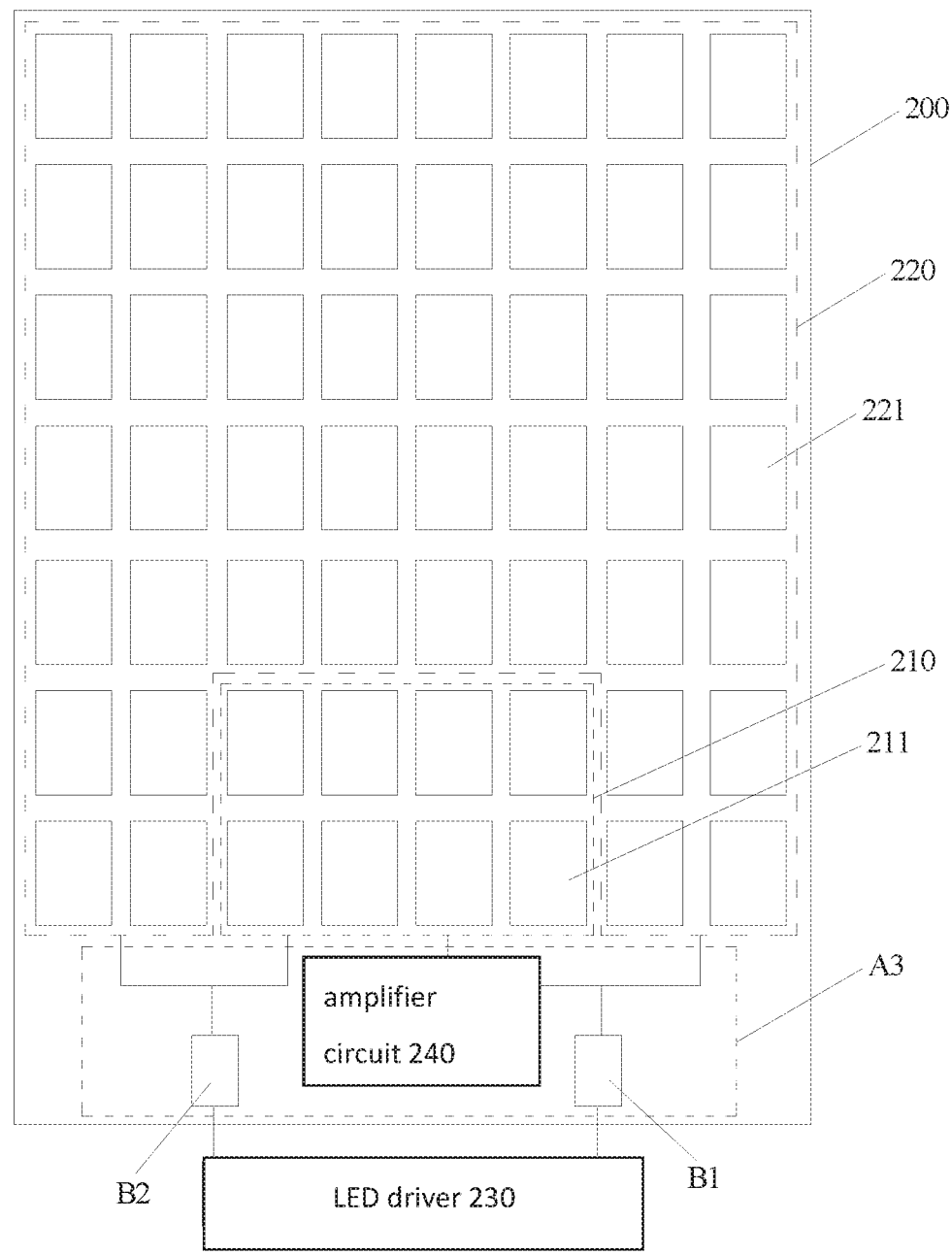
FIG. 3 is a schematic view of the backlight module in accordance with one embodiment of the present disclosure.

FIG. 3 is a schematic view of the backlight module in accordance with one embodiment of the present disclosure.

Referring to FIG. 3, the backlight module 200 may face toward the liquid crystal panel 100 in FIG. 1 so as to provide the backlight to the liquid crystal panel 100. The backlight module 200 includes a first light emission section 210 and a second light emission section 220. The first light emission section 210 faces toward the in-plane identification area A1, that is, the first light emission section 210 faces toward the plurality of first sub-pixels 110. The second light emission section 220 faces toward the non-identification area A2, that is, the second light emission section 220 faces toward the plurality of second sub-pixels 120.

In order to solve the problem of uneven display brightness of the in-plane recognition area A1 and the non-recognition area A2 of the liquid crystal panel 100, the light emission brightness of the first light emission section 210 may be greater than the light emission brightness of the second light emission section 220, so that the first light emission section 220 may be compensated for the reason that the first opening area 111 of the sub-pixel 110 is blocked by the photodetector 130, which reduces the display brightness of the in-plane identification area A1, thereby aligning the display brightness of the in-plane identification area A1 with the display brightness of the non-recognition area A2. Thus, the display performance of the liquid crystal panel 100 is uniform.

Further, the transmittance (or average transmittance) of the plurality of second sub-pixels 120 may be determined in advance, that is, the transmittance (or average transmittance) of the non-recognition area A2 may be measured in advance. The transmittance (or average transmittance) of the first sub-pixels 110, i.e., the transmittance (or average transmittance) of the in-plane recognition area A1, may also be determined in advance. As such, a ratio of the light emission brightness of the first light emission section 210 to the light emission brightness of the second light emission section 220 equals to the ratio of the light emission brightness of the second light emission section 220 to the light emission brightness of the first light emission section 210. Thus, the display brightness of the in-plane identification area A1 is the same with that of the non-recognition area A2. Differences in display brightness appearing between the in-plane identification area A1 and the non-recognition area A2 due to different transmittances can be compensated for by differences in the light emission luminances of the first light emission section 210 and the second light emission section 220.

In addition, in order to adjust the light emission brightness of the first light emission section 210 and the second light emission section 220, the first light emission section 210 includes a plurality of first LEDs 211, and the second light emission section 220 includes a plurality of second LEDs 221. In an example, the first LEDs 211 are the same with the second LEDs 221. The arrangement of the first LEDs 211 of the first light emission section 210 is the same with that of the second LEDs 221 of the second light emission section 220.

Further, the first LEDs 211 of the first light emission section 210 are arranged in a matrix. In addition, the second LEDs 221 of the second light emission section 220 are arranged in a matrix. That is, the first LEDs 211 and the second LEDs 221 are arranged in matrix.

In one embodiment, the first LEDs 211 and the second LEDs 221 may be, but not limited to, micro LEDs, i.e., Micro LED. As such, each of the first LEDs 211 corresponds to one first sub-pixel 110. In addition, each of the second LEDs 221 corresponds to one second sub-pixel 120. That is, one second LED 221 corresponds to one second sub-pixel 120.

A driving current of the first LEDs 211 is greater than that of the second LEDs 221 such that the brightness of the first light emission section 210 is greater than that of the second light emission section 220.

In this embodiment, the backlight module 200 further includes a LED driver 230, wherein the LED driver 230 provides driving current to the first LEDs 211 and the second LEDs 221. Further, the LED driver 230 connects to the first LEDs 211 and the second LEDs 221 via at least one bonding electrode within a bonding area A3, i.e., the anode B1 and the cathode B2.

Usually, the LED driver 230 provides the same driving current to the first LEDs 211 and the second LEDs 221 via the bonding electrodes. In one embodiment, the backlight module 200 further includes an amplifier circuit 240 to make the driving current of the first LEDs 211 to be greater than that of the second LEDs 221. The amplifier circuit 240 is configured between the anode B1 and the first LED 211 so as to amplify the driving current provided from the LED driver 230 to the first LEDs 211.

In view of the above, the loss of the transmittance of the first sub-pixel is compensated by increasing the light emission brightness of the first light emission section, which is opposite to the first sub-pixels. Thus, the display brightness of the LCD panel is uniform.

The above description is merely the embodiments in the present disclosure, the claim is not limited to the description thereby. The equivalent structure or changing of the process of the content of the description and the figures, or to implement to other technical field directly or indirectly should be included in the claim.

What is claimed is:

1. A liquid crystal display, comprising:
    a liquid crystal panel comprising a plurality of photodetectors, a plurality of first sub-pixels and a plurality of second sub-pixels respectively corresponding to the photodetectors, each of the photodetectors partially overlapping with an opening area of the corresponding first sub-pixel; and
    a backlight module facing toward the liquid crystal panel having a first light emission section and a second light emission section, the first light emission section facing toward the first sub-pixels, the second light emission section facing toward the second sub-pixels, and a light emission brightness of the first light emission section being greater than a light emission brightness of the second light emission section.

2. The liquid crystal display as claimed in claim 1, wherein a ratio of the light emission brightness of the first light emission section to the light emission brightness of the second light emission section equals to a ratio of the light emission brightness of the second light emission section to the light emission brightness of the first light emission section.

3. The liquid crystal display as claimed in claim 1, wherein the first light emission section comprises a plurality of first LEDs, and the second light emission section comprises a plurality of second LEDs, and a driving current of the first LEDs is greater than a driving current of the second LEDs.

4. The liquid crystal display as claimed in claim 2, wherein the first light emission section comprises a plurality of first LEDs, and the second light emission section comprises a plurality of second LEDs, and a driving current of the first LEDs is greater than a driving current of the second LEDs.

5. The liquid crystal display as claimed in claim 3, wherein the backlight module further comprises:
    a LED driver configured to respectively provide a driving current to each of the first LEDs and each of the second LEDs; and
    an amplifier circuit configured between the LED driver and the first LEDs to amplify the driving current provided from the LED driver to the first LEDs.

6. The liquid crystal display as claimed in claim 4, wherein the backlight module further comprises:
    a LED driver configured to respectively provide a driving current to each of the first LEDs and each of the second LEDs; and
    an amplifier circuit configured between the LED driver and the first LEDs to amplify the driving current provided from the LED driver to the first LEDs.

7. The liquid crystal display as claimed in claim 5, wherein the first LEDs and the second LEDs connect to the LED driver via at least one bonding electrode within a bonding area.

8. The liquid crystal display as claimed in claim 6, wherein the first LEDs and the second LEDs connect to the LED driver via at least one bonding electrode within a bonding area.

9. The liquid crystal display as claimed in claim 3, wherein an arrangement of the first LEDs of the first light emission section is same with the arrangement of the second LEDs of the second light emission section.

10. The liquid crystal display as claimed in claim 4, wherein an arrangement of the first LEDs of the first light emission section is same with the arrangement of the second LEDs of the second light emission section.

11. The liquid crystal display as claimed in claim 3, wherein each of the first LEDs corresponds to a respective one of the first sub-pixels, and each of the second LEDs corresponds to a respective one of the second sub-pixels.

12. The liquid crystal display as claimed in claim 4, wherein each of the first LEDs corresponds to a respective one of the first sub-pixels, and each of the second LEDs corresponds to a respective one of the second sub-pixels.

13. The liquid crystal display as claimed in claim 11, wherein the first LEDs and the second LEDs are Micro LEDs.

14. The liquid crystal display as claimed in claim 12, wherein the first LEDs and the second LEDs are Micro LEDs.

15. The liquid crystal display as claimed in claim 1, wherein the photodetectors are arranged in a matrix.

16. The liquid crystal display as claimed in claim 1, wherein the photodetectors comprise fingerprint identification photodetectors.

17. The liquid crystal display as claimed in claim 15, wherein the photodetectors comprise fingerprint identification photodetectors.

* * * * *